(12) United States Patent
Nishimi et al.

(10) Patent No.: US 8,345,282 B2
(45) Date of Patent: Jan. 1, 2013

(54) IMAGE FORMING SYSTEM AND IMAGE FORMING APPARATUS

(75) Inventors: Toshitsugu Nishimi, Osaka (JP); Yasushi Tsukamoto, Osaka (JP); Akira Fujikura, Osaka (JP)

(73) Assignee: Kyocera Document Solutions Inc. (JP)

( * ) Notice: Subject to any disclaimer, the term of this patent is extended or adjusted under 35 U.S.C. 154(b) by 1029 days.

(21) Appl. No.: 12/183,259

(22) Filed: Jul. 31, 2008

(65) Prior Publication Data

US 2009/0033974 A1 Feb. 5, 2009

(30) Foreign Application Priority Data

Aug. 3, 2007 (JP) .................................. 2007-202718
Aug. 3, 2007 (JP) .................................. 2007-202723

(51) Int. Cl.
G06F 3/12 (2006.01)
G06F 17/50 (2006.01)
G03G 15/00 (2006.01)
G06Q 10/00 (2012.01)

(52) U.S. Cl. ............... 358/1.15; 399/8; 399/24; 705/28; 705/29; 340/5.9; 340/5.92; 340/8.1; 340/568.1; 340/572.1

(58) Field of Classification Search ................ 340/8.1, 340/568.1, 572.1, 635
See application file for complete search history.

(56) References Cited

U.S. PATENT DOCUMENTS

| | | | | |
|---|---|---|---|---|
| 5,335,048 A | * | 8/1994 | Takano et al. ...................... | 399/8 |
| 5,594,529 A | * | 1/1997 | Yamashita et al. ................. | 399/8 |
| 6,016,409 A | * | 1/2000 | Beard et al. ...................... | 399/33 |
| 2004/0090647 A1 | * | 5/2004 | Beard et al. .................. | 358/1.14 |
| 2005/0057768 A1 | * | 3/2005 | Kuppens-Ellouz et al. . | 358/1.14 |
| 2005/0147421 A1 | * | 7/2005 | Nakashima ...................... | 399/23 |
| 2007/0036559 A1 | * | 2/2007 | Thomas ............................. | 399/8 |

FOREIGN PATENT DOCUMENTS

| | | | |
|---|---|---|---|
| JP | 2001-2379997 | | 8/2001 |
| JP | 2002-111943 A | * | 4/2002 |
| JP | 2003-316553 | | 11/2003 |
| JP | 2004-206588 | * | 7/2004 |
| JP | 2005-025359 | * | 1/2005 |
| JP | 2006-221426 | * | 8/2006 |

\* cited by examiner

Primary Examiner — King Poon
Assistant Examiner — Vincent Peren
(74) Attorney, Agent, or Firm — Stephen Chin

(57) ABSTRACT

In an image forming system, a server includes (a) a transmitting/receiving unit that receives consumable-goods shortage information and consumable-goods stock information via a network and transmits the consumable-goods stock information and stock retrieval information for retrieving the consumable goods via a network, the consumable-goods shortage information indicating a shortage of consumable goods in an image forming apparatus, the consumable-goods stock information indicating an available stock in an image forming apparatus, and (b) a management control unit that causes the transmitting/receiving unit to transmit the stock retrieval information to the other image forming apparatuses than one of the image forming apparatuses that transmits the consumable-goods shortage information to the server, and causes the transmitting/receiving unit to transmit the consumable-goods stock information obtained from the other image forming apparatuses as a result of retrieving the consumable goods via the network.

6 Claims, 10 Drawing Sheets

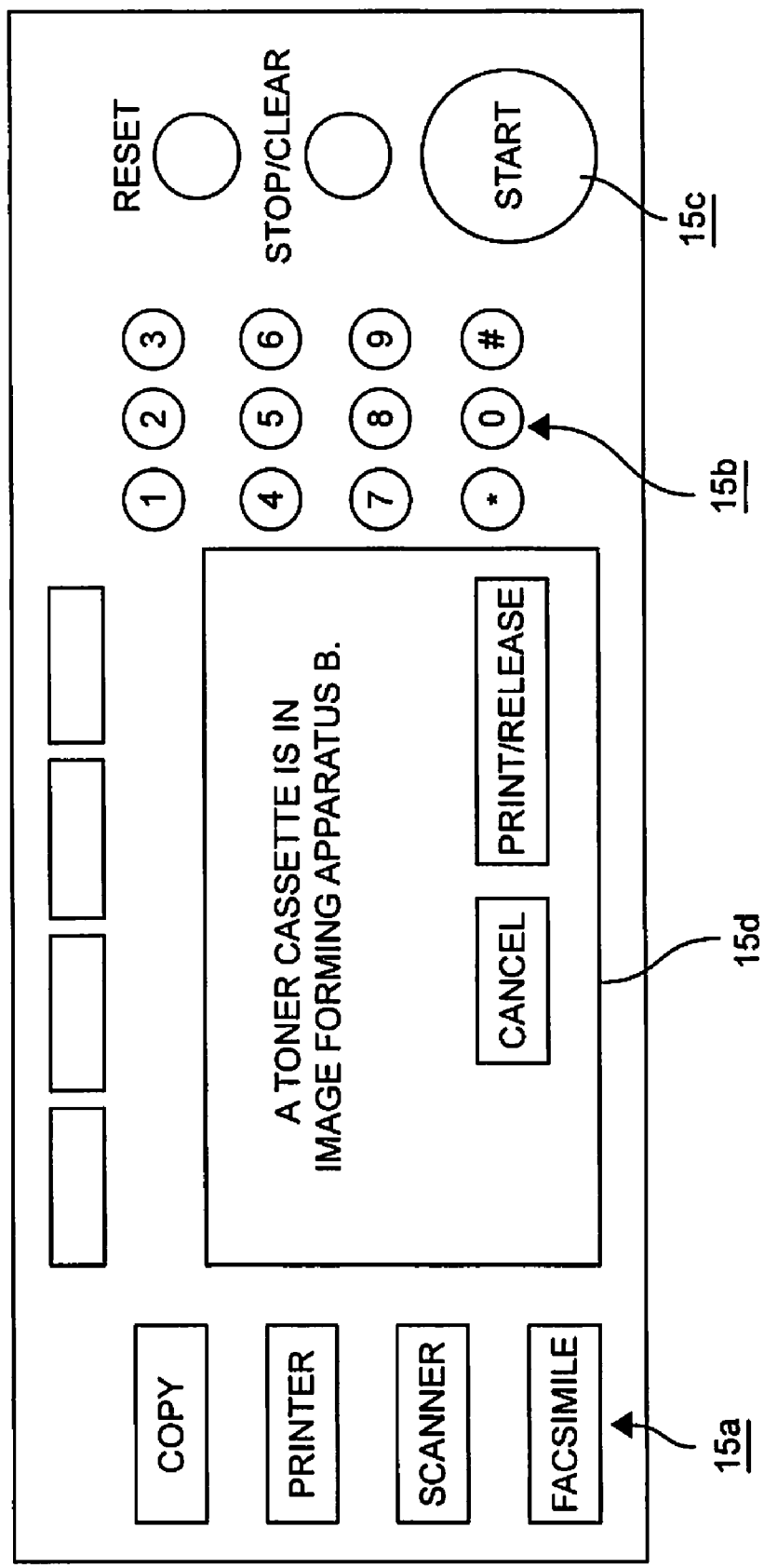

| APPARATUS | FUNCTION (VERSION) | LOCATION INFORMATION | |
|---|---|---|---|
| A | XXXXX | 1F: ZONE 3 | |
| B | XXXXX | 1F: ZONE 9 | |
| C | XXXXX | 1F: ZONE 13 | |

| APPARATUS | TONER CASSETTE | PAPER INFORMATION | |
|---|---|---|---|
| A | TONER EMPTY | PAPER EMPTY | |
| B | CASSETTE1 AVAILABLE | A4/A3 PAPER AVAILABLE | |
| C | CASSETTE2 AVAILABLE | A4/B4/A3 PAPER AVAILABLE | |

FIG.10A

| APPARATUS | TONER CASSETTE | PAPER1 | PAPER2 | TIME PERIOD 1 9:00 TO 20:00 | TIME PERIOD 2 20:00 TO 9:00 |
|---|---|---|---|---|---|
| 10A | 10% | 5% | 5% | 5% INCREMENT | 3% DECREMENT |
| 10B | 15% | 10% | 10% | 5% INCREMENT | 3% DECREMENT |
| --- | --- | --- | --- | --- | --- |

FIG.10B

| APPARATUS | TONER CASSETTE | PAPER1 | PAPER2 |
|---|---|---|---|
| 10A | NEED REPLACEMENT | NEED REPLENISHMENT | NORMAL |
| 10B | NORMAL | NORMAL | NORMAL |
| --- | --- | --- | --- |

FIG.11

CONSUMPTION GOODS
ORDER SHEET

USER NUMBER: 1234567

CONTACT: 000-0000-0000

MFP: 00-000-000

TYPE: TONER CASSETTE

PRODUCT CODE: ABC12345

AMOUNT: 1

FIG.12

A TONER CASSETTE
HAS BEEN ORDERED.

| CANCEL | PRINT/RELEASE |

113

IMAGE FORMING SYSTEM AND IMAGE FORMING APPARATUS

CROSS-REFERENCE TO RELATED APPLICATIONS

This application relates to and claims priority rights from Japanese Patent Application Nos. 2007-202718 and 2007-202723, both filed on Aug. 3, 2007 the entire disclosure of which is hereby incorporated by reference herein.

BACKGROUND OF THE INVENTION

1. Field of the Invention

This invention relates to image forming apparatus and image forming apparatus and specifically relates to management of consumable goods in an image forming system and an image forming apparatus such as copier or MFP (Multi Function Peripheral).

2. Description of the Related Art

Recently, a copier, an MFP or the like and computers are connected to a network, and for printing, the computers transmit a print job to the copier or the MFP via the network. In such system, if it is not enough to watch states of consumable goods such as printing toner and/or printing paper in the copier or the MFP for stock management of the consumable goods, a shortage of the consumable goods takes place and may interrupt printing process and affect business tasks.

In Japanese patent application laid-open publication 2003-316553 (Literature 1), a stock managing apparatus and a stock managing system are proposed for supporting stock management.

According to Literature 1, the system contains (a) determining means for determining consumable goods for a device such as image forming apparatus according to designation by the device, (b) relating means for generating information on relation between the consumable goods determined by the determining means and a storage where the consumable goods are stored for the device, and (c) registering means for registering the information generated by the relating means. In this system, a consumable-goods list is referred to for determining whether the information has been registered in the list, and the information is registered only if the information has not been registered in the list. Consequently, storages of a plurality of consumable goods for a plurality of devices are managed properly.

In addition, in Japanese patent application laid-open publication 2001-237997 (Literature 2), a facsimile machine is proposed for supporting stock management.

According to Literature 2, the facsimile machine contains (a) detecting means for detecting operations of replenishment or replacement of consumable goods to be replenished or replaced, and (b) automatic ordering means for transmitting order information of the consumable goods via a network to a predetermined address when the number of operations detected by the detecting means reaches a predetermined value. Consequently, a shortage of the consumable goods can be avoided without user's stock management of the consumable goods.

SUMMARY OF THE INVENTION

In the apparatus and the system of aforementioned Literature 1, although a stock of consumable goods such as printing toner is confirmed with computers, complicated user operations are required to register stock information of the consumable goods for each of the computers.

In addition, in the apparatus and the system in aforementioned Literature 1, a storage of consumable goods is an ordinary storehouse or the like, and a user needs to go the storehouse to obtain consumable goods even if a location of the storage of consumable goods is determined. Therefore, it tends to take a long time to replenish consumable goods.

The inventors conceived this invention and reduced it to practice with paying attention to that an image forming apparatus often stores spares and/or reserve stocks of consumable goods therein, that are available for another image forming apparatus with a shortage of consumable goods.

This invention was conceived to overcome the problem mentioned above. An object of this invention is to provide an image forming system and an image forming apparatus that are capable of retrieving for another image forming apparatus with an available stock of consumable goods when the consumable goods become short in an image forming apparatus and enabling a user to supply consumable goods in a short time to an image forming apparatus with a shortage.

Further, in the facsimile machine described in aforementioned Literature 2, although stock management of a facsimile machine is improved, if there is a plurality of image forming apparatuses such as facsimile machine connected to a network, this stock management is not always appropriate for a group of the image forming apparatuses.

This invention was conceived to overcome the problem mentioned above. An object of this invention is to provide an image forming system capable of confirming a state of consumable goods in an image forming apparatus connected to a network on a server side and enabling a user to replenish and/or replace consumable goods before the consumable goods become short.

The present invention solves these subjects as follows.

An image forming system according to an aspect of the present invention includes (a) two or more image forming apparatuses connected to a network and (b) a server that is connected to the network and manages the image forming apparatuses. The server includes (c) a transmitting/receiving unit that receives consumable-goods shortage information and consumable-goods stock information via the network and transmits the consumable-goods stock information and stock retrieval information for retrieving the consumable goods via the network, and (d) a management control unit that causes the transmitting/receiving unit to transmit the stock retrieval information to the other image forming apparatuses than one of the image forming apparatuses that transmits the consumable-goods shortage information to the server, and causes the transmitting/receiving unit to transmit the consumable-goods stock information obtained from the other image forming apparatuses as a result of retrieving the consumable goods via the network. The consumable-goods shortage information indicates a shortage of consumable goods in an image forming apparatus, and the consumable-goods stock information indicates an available stock in an image forming apparatus.

In the aforementioned image forming system, each of the image forming apparatuses may include (e) a detecting unit that detects a shortage and a stock of consumable goods and outputs the consumable-goods shortage information and the consumable-goods stock information of this image forming apparatus, (f) a transmitting/receiving unit that transmits the consumable-goods shortage information and/or the consumable-goods stock information from the detecting unit to the server, and receives the stock retrieval information and/or the consumable-goods stock information from the server, and (g) a control unit that causes the transmitting/receiving unit to transmit the consumable-goods shortage information if the detecting unit outputs the consumable-goods shortage information, and to transmit the consumable-goods stock information if the detecting unit detects a stock of consumable goods specified in the stock retrieval information received by the transmitting/receiving unit.

In the aforementioned image forming system, the consumable goods may be either printing toner or printing paper.

In the aforementioned image forming system, the detecting unit of an image forming apparatus may detect a stock of consumable goods with a RFID device placed on the consumable goods.

In the aforementioned image forming system, the detecting unit may output the consumable-goods stock information including stock status information indicating whether or not consumable goods have been installed and/or whether or not consumable goods are being used.

In the aforementioned image forming system, the detecting unit may include a first detector that outputs the consumable-goods shortage information, and a second detector that outputs the consumable-goods stock information.

In the aforementioned image forming system, the control unit of the image forming apparatus may cause to transmit the consumable-goods stock information with location information of the image forming apparatus.

In the aforementioned image forming system, the management control unit of the server may cause the transmitting/receiving unit to transmit the consumable-goods stock information to the image forming apparatus that transmitted the consumable-goods shortage information. The image forming apparatus may have a display unit, and the control unit of the image forming apparatus may cause the display unit to indicate the received consumable-goods stock information and the image forming apparatus transmitting the received consumable-goods stock information.

In the aforementioned image forming system, the control unit of the image forming apparatus may cause the transmitting/receiving unit to transmit the consumable-goods stock information to a computer connected to the network.

An image forming apparatus according to an aspect of the present invention includes (a) a detecting unit that detects a shortage and a stock of consumable goods and outputs consumable-goods shortage information and consumable-goods stock information of this image forming apparatus, (b) a transmitting/receiving unit that transmits the consumable-goods shortage information and/or the consumable-goods stock information from the detecting unit to a server, and receives stock retrieval information and/or consumable-goods stock information from the server, and (c) a control unit that causes the transmitting/receiving unit to transmit the consumable-goods shortage information if the detecting unit outputs the consumable-goods shortage information, and to transmit the consumable-goods stock information if the detecting unit detects a stock of consumable goods specified in the stock retrieval information received from the server by the transmitting/receiving unit. The consumable-goods shortage information indicates a shortage of consumable goods in this image forming apparatus, and the consumable-goods stock information indicates an available stock in this image forming apparatus.

According to the image forming system or the image forming apparatus of an aspect of the present invention, if the server receives consumable-goods shortage information from the image forming apparatus via the network, then the server transmits stock retrieval information to image forming apparatuses other than the image forming apparatus that transmitted the consumable-goods shortage information. After transmitting the stock retrieval information to retrieve consumable goods that is out of stock, if the server receives consumable-goods stock information indicating an available stock of the consumable goods, then the server transmits the consumable-goods stock information. Therefore, the server retrieves for another image forming apparatus with an available stock of consumable goods when the consumable goods become short in an image forming apparatus, that is, stock management of image forming apparatuses is unified on the server. Consequently, it is possible for a user to supply consumable goods to an image forming apparatus with a shortage.

Further, an image forming apparatus with a shortage of consumable goods transmits consumable-goods shortage information indicating the shortage in this image forming apparatus to the server via a network. On the other hand, an image forming apparatus with an available stock of the consumable goods transmits consumable-goods stock information to the server upon reception of stock retrieval information from the server. Hence, the image forming apparatus with a shortage determines one or more other image forming apparatuses with an available stock of the consumable goods. Consequently, a user can easily find another image forming apparatus with an available stock.

Furthermore, in case that the consumable goods are either printing toner or printing paper, in terms of retrieval for a stock of such consumable goods, it is possible for a user to supply high-consumed consumable goods (i.e. printing toner or printing paper) in a short time to an image forming apparatus with a shortage.

Furthermore, in case that the detecting unit of the image forming apparatus detects a stock of consumable goods with a RFID device placed on the consumable goods, it is possible to detect not only consumable goods installed in the image forming apparatus but consumable goods put near the image forming apparatus.

Furthermore, in case that the detecting unit outputs the consumable-goods stock information including stock status information indicating whether or not consumable goods has been installed and/or whether or not consumable goods are being used, it is possible to display the stock status information.

Furthermore, in case that the detecting unit includes a first detector that outputs the consumable-goods shortage information, and a second detector that outputs the consumable-goods stock information, it is possible to output the consumable-goods shortage information and the consumable-goods stock information individually and surely.

Furthermore, in case that the control unit of the image forming apparatus causes to transmit the consumable-goods stock information with location information of the image forming apparatus, it is possible for a user to determine an image forming apparatus with an available stock and easily find location of the image forming apparatus. Therefore, the user can supply consumable goods in a shorter time.

Furthermore, in case that the management control unit of the server causes the transmitting/receiving unit to transmit the consumable-goods stock information to the image forming apparatus that transmitted the consumable-goods shortage information, the image forming apparatus has a display unit, and the control unit of the image forming apparatus causes the display unit to indicate the received consumable-goods stock information and the image forming apparatus transmitting the received consumable-goods stock information, it is possible for a user to determine an image forming apparatus with an available stock of consumable goods at a location of an image forming apparatus with a shortage of the consumable goods. Therefore, the user can supply consumable goods in a short time.

Furthermore, in case that the control unit of the image forming apparatus causes the transmitting/receiving unit to transmit the consumable-goods stock information to a computer connected to the network, it is possible for user to determine an image forming apparatus with an available stock at an external computer. Therefore, the user can supply consumable goods in a short time.

An image forming system according to an aspect of the present invention includes (a) an image forming apparatus connected to a network and (b) a server that is connected to the network and manages the image forming apparatus. The image forming apparatus includes (a1) a detecting unit that outputs consumable-goods information in relation to the consumption amount of consumable goods in this image forming apparatus, (a2) a communicating unit that transmits the consumable-goods information to the server via the network, and (a3) a control unit that causes the communicating unit to transmit the consumable-goods information if the detecting unit outputs the consumable-goods information. The server includes (b1) a communicating unit that receives the consumable-goods information from the image forming apparatus via the network, (b2) an outputting unit that outputs at least consumable-goods management data in relation to the consumable goods in terms of either printing or displaying the data, and (b3) a management control unit that generates the consumable-goods management data based on the consumable-good information received by the communicating unit, and causes the outputting unit to output the consumable-goods management data.

In the aforementioned image forming system, the management control unit of the server may determine whether or not the consumption amount of consumable goods exceeds a predetermined threshold value, and may cause the outputting unit to output the consumable-goods management data including information on replenishment and/or replacement of the consumable goods when the consumption amount exceeds the threshold value.

In the aforementioned image forming system, the consumable goods may be either printing toner or printing paper.

In the aforementioned image forming system, the detecting unit of the image forming apparatus may detect the consumption amount of consumable goods with a RFID device placed on the consumable goods.

In the aforementioned image forming system, the management control unit of the server may change the threshold value with preset values in respective time periods.

In the aforementioned image forming system, the management control unit of the server may generate a purchase order for the replenishment and/or the replacement, and may cause either the outputting unit or the communicating unit to output or transmit the purchase order.

According to the image forming system of an aspect of the present invention, in an image forming apparatus, the detecting unit outputs consumable-goods information in relation to the consumption amount of consumable goods installed in this image forming apparatus and the control unit causes the communicating unit to transmit the consumable-goods information to the server via a network, and in the server, after the communicating unit receives the consumable-goods information via the network, the management control unit generates consumable-goods management data and causes the outputting unit to output the consumable-goods management data. Therefore, on a server side, it is possible to confirm a state of consumable goods in an image forming apparatus connected to a network, and it is possible for a user to replenish and/or replace consumable goods before the consumable goods become short.

Further, in case that the management control unit of the server determines whether or not the consumption amount of consumable goods exceeds a predetermined threshold value, and causes the outputting unit to output the consumable-goods management data including information on replenishment and/or replacement of the consumable goods when the consumption amount exceeds the threshold value, it is possible for user to easily find whether replenishment and/or replacement of the consumable goods are/is necessary or not.

Furthermore, in case that the consumable goods are either printing toner or printing paper, in terms of retrieval for a stock of such consumable goods, it is possible for a user to supply high-consumed consumable goods (i.e. printing toner or printing paper) in a short time to an image forming apparatus with a shortage.

Furthermore, in case that the detecting unit of the image forming apparatus detects the consumption amount of consumable goods with a RFID device placed on the consumable goods, it is possible to detect not only consumable goods installed in the image forming apparatus but consumable goods put near the image forming apparatus.

Furthermore, in case that the management control unit of the server changes the threshold value with preset values in respective time periods, it is possible to manage replenishment and/or replacement in consideration of usage conditions of an image forming apparatus in predetermined working time or seasons.

Furthermore, in case that the management control unit of the server generates a purchase order for the replenishment and/or the replacement, and cause either the outputting unit or the communicating unit to output or transmit the purchase order, it is possible to arrange replenishment and/or replacement automatically.

These and other objects, features and advantages of the present invention will become more apparent upon reading of the following detailed description along with the accompanied drawings.

BRIEF DESCRIPTION OF THE DRAWINGS

FIG. 4 shows an indication state of an operation indicating unit in the image forming apparatus of Embodiment 1;

FIGS. 10A and 10B show an example of consumable-goods management data in Embodiment 2;

FIG. 11 shows a purchase order of consumable goods in Embodiment 2; and

FIG. 12 shows an indication state in the image forming apparatus in Embodiment 2.

DETAILED DESCRIPTION OF THE PREFERRED EMBODIMENT

Hereinafter, embodiments according to aspects of the present invention will be explained with reference to drawings.

Embodiment 1

Figure 1:
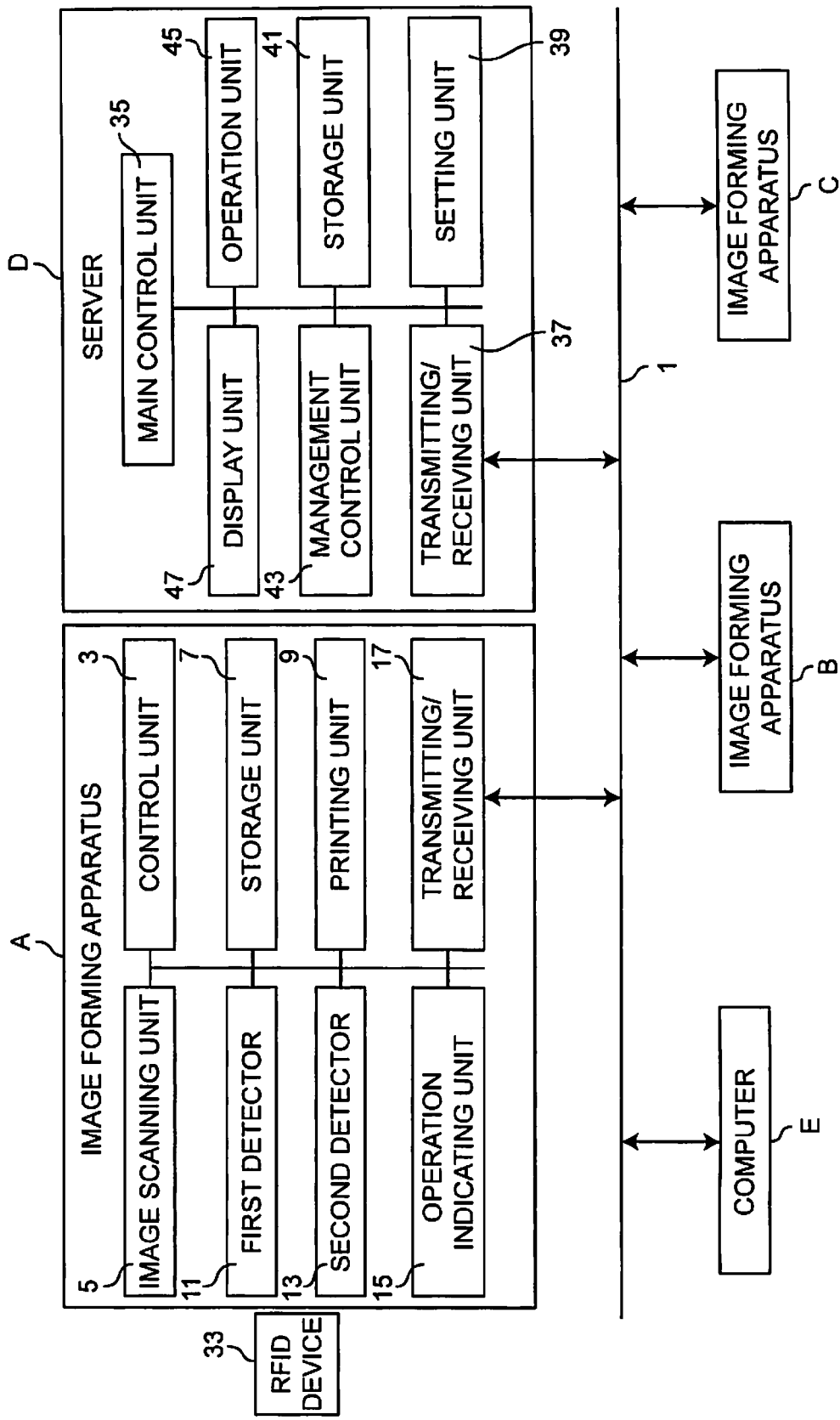
FIG. 1 is a schematic block diagram indicating an image forming system that contains an image forming apparatus of Embodiment 1.

FIG. 1 is a schematic block diagram indicating an image forming system that contains an image forming apparatus of Embodiment 1.

In the image forming system shown in FIG. 1, image forming apparatuses A, B and C, and a server D are connected to each other via a network 1. The network 1 is a LAN such as intranet, the Internet, or other known network.

Since the image forming apparatuses A, B and C has the same configuration, here is explained only the image forming apparatus A and detailed explanation of the image forming apparatuses B and C is omitted.

Firstly, the image forming apparatus A is explained.

The image forming apparatus A is an image forming apparatus such as MFP having a control unit 3 as the center, an image scanning unit 5, a storage unit 7, a printing unit 9, a first detector 11, a second detector 13, an operation indicating unit 15, and a transmitting/receiving unit 17. There are other components in the image forming apparatus A, but here are omitted explanation and illustration of the other components.

The image scanning unit 5 is a scanner or other known device that scans optically, for example, images on pages of a printed document under control by the control unit 3 and generates electronic image data as a print job in terms of necessary processes such as filtering the images. Image data of respective pages generated by the image scanning unit 5 are stored in the storage unit 7.

The storage unit 7 stores image data scanned by the image scanning unit 5, image data received by the transmitting/receiving unit 17 (mentioned below), received consumable-goods stock information (mentioned below), and a control program of the control unit 3. Readable and writable medium such as hard disk drive is used as the storage unit 7.

Figure 2:
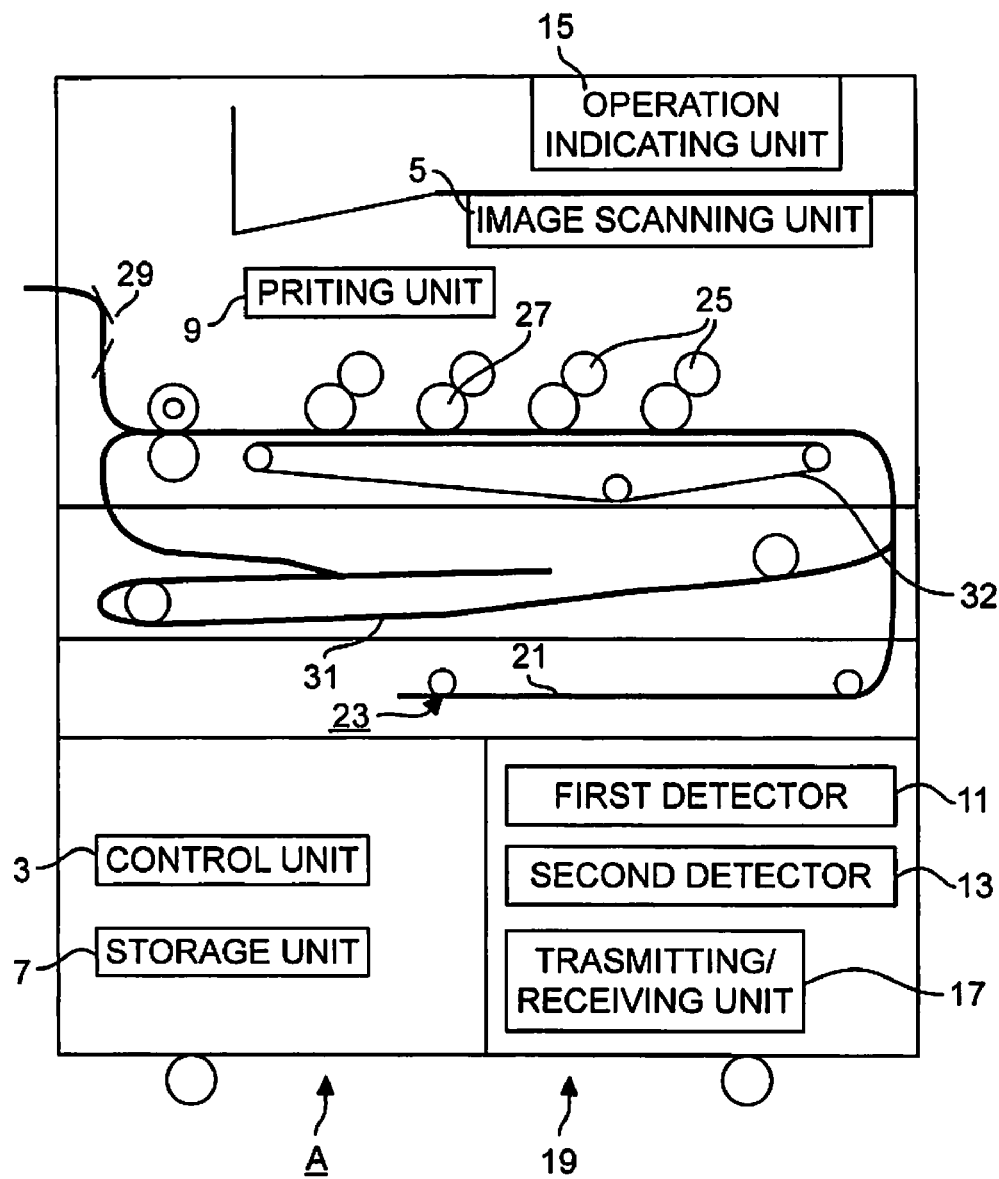
FIG. 2 shows an example of configuration of the image forming apparatus in Embodiment 1.

The printing unit 9 is either a color print engine or a monochrome print engine, and has, as shown in FIG. 2, (a) paper drawers 23 in a lower part of a body case 19 (one paper drawer 23 depicted in FIG. 2) in which respective types of printing paper 21 are placed, (b) a toner cassette 25 that contains printing toner, (c) a transferring and fixing unit 27 that generates print data from the aforementioned image data, develops a toner image with printing toner from the toner cassette 25, and transfers and fixes the toner image on the printing paper 21, and (d) an outputting unit 29 that outputs the printing paper 21 on which an image has been printed, and other components.

In the printing unit 9, a reversal transportation unit 31 reverses the printing paper 21 in duplex printing, and a transportation belt 32 transports the printing paper 21.

The first detector 11 and the second detector 13 are capable of outputting detection information on consumable goods in the printing unit 9 under control by the control unit 3.

Specifically, the first detector 11 detects paper empty of the printing paper 21 as consumable goods on each of the paper drawers 23 and outputs consumable-goods shortage information of the printing paper 21, and detects toner empty of the toner cassette 25 with an identification code and outputs consumable-goods shortage information of the toner cassette 25.

Figure 3:
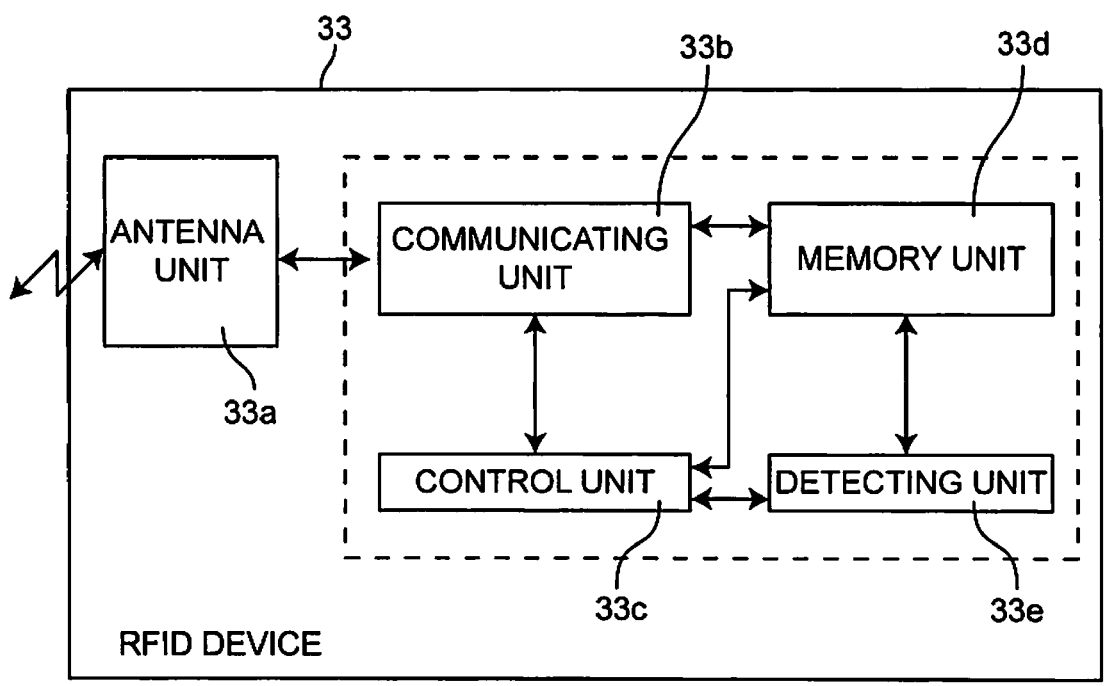
FIG. 3 is a schematic block diagram that explains configuration of a RFID device in Embodiment 1.

More specifically, toner empty of the toner cassette 25 and the identification code are detected via the RFID device 33 without contact by the first detector 11. As shown in FIG. 3, for example, the RFID device 33 contains an antenna unit 33a, a communicating unit 33b, a control unit 33c, a memory unit 33d, and a detecting unit 33e.

The RFID device 33 equips the toner cassette 25 and operates with a power supply generated from a high-frequency signal emitted by the first or second detector 11 or 13. The high-frequency signal is received by the antenna unit 33a and demodulated and rectified by the communicating unit 33b in order to generate the power supply. In the RFID device 33, the memory unit 33d has stored the identification code assigned to the toner cassette 25, the control unit 33c reads out the identification code from the memory unit 33d, the detecting unit 33e outputs toner empty information when detecting toner empty due to consumption of the toner, and the control unit 33c generates an output signal containing consumable-goods shortage information in terms of combination of the identification code and the toner empty information. In the communicating unit 33b, a high-frequency carrier is modulated with the output signal with a predetermined format and the modulated carrier as a high-frequency signal is emitted from the antenna unit 33a.

The first detector 11 has a function for receiving and demodulating the high-frequency signal from the RFID device 33 to obtain the consumable-goods shortage information containing the identification code and the toner empty information of the toner cassette 25, and for outputting the consumable-goods shortage information to the control unit 3.

The second detector 13 detects how much a stock of consumable goods is and outputs consumable-goods stock information indicating the detected amount of consumable goods to the control unit 3 under control by the control unit 3 if the detected amount exceeds a predetermined value.

The second detector 13 detects how much the amount of the printing paper 21 is in each of the paper drawers 23 and outputs the consumable-goods stock information of the printing paper 21 to the control unit 3 if the detected amount exceeds a predetermined value.

The second detector 13 detects the remaining amount of toner in the toner cassette 25 and outputs the consumable-goods stock information of the toner cassette 25 to the control unit 3 if the detected remaining amount of toner exceeds a predetermined value.

The second detector 13 can detect the printing paper 21 that has not been put in the paper drawers 23 and the toner cassette 25 that has not been installed in the apparatus via the RFID device 33 without contact if the RFID device 33 equips such printing paper 21 and such toner cassette 25.

Therefore, it is possible to detect a stock of the printing paper 21 and the toner cassette 25 that are stored in or near each of the image forming apparatuses A, B and C, namely, in an area where the first and second detectors 11 and 13 can communicate with the RFID device 33.

The operation indicating unit 15 is placed on the upper surface of the body case 19 shown in FIG. 2 and has a known liquid crystal display panel and an operation unit (a setting unit). The display panel is a display unit capable of indicating various operation states of the apparatus. The operation unit can detect user's touch operation to a position where an image related to an operation of the apparatus is displayed on the panel.

The operation indicating unit 15 contains a touch-type keyboard including selection keys 15a, ten keys 15b and a start key 15c, and a display panel 15d. The selections keys 15a are for detecting respective user's operations to select a function from various functions such as printer function, copier function, scanner function and facsimile transmitting/receiving function. The ten keys 15b are for detecting user's operations to input a user ID (for example, an employee number) identifying a user, renewal values of setting items in those functions, and so on. The display panel 15d indicates an operation state of the apparatus.

Referring to FIG. 1 again, the transmitting/receiving unit 17 is an interface unit that transmits/receives image data via the network 1 to/from the other image forming apparatuses B and C according to a predetermined communication protocol, transmits the consumable-goods shortage information and the consumable-goods stock information to the server D, and receives stock retrieval information mentioned below from the server D.

Further, the transmitting/receiving unit 17 establishes connections with the other image forming apparatuses B and C and the server D automatically when the transmitting/receiving unit 17 is connected to the network 1, and has a function for transmitting/receiving information to/from a counterpart, for example, specified with a network address or the like. In addition, the transmitting/receiving unit 17 also transmits and receives facsimile signals.

The control unit 3 has a CPU and a ROM that stores a control program to be executed by the CPU, and controls the image scanning unit 5, the storage unit 7, the printing unit 9, the first detector 11, the second detector 13, the operation indicating unit 15, the transmitting/receiving unit 17 and other components not shown.

Further, the control unit 3 causes the transmitting/receiving unit 17 to transmit consumable-goods shortage information that specifies this image forming apparatus A via the network 1 to the server D when the control unit 3 obtains the consumable-goods shortage information of the printing paper 21 or the toner cassette 25 from the first detector 11.

Further, the control unit 3 controls the second detector 13 to try to detect a stock of the printing paper 21 or the toner cassette 25 when the transmitting/receiving unit 17 receives stock retrieval information, and causes the transmitting/receiving unit 17 to transmit consumable-goods stock information (i.e. information indicating detection of consumable goods) that specifies this image forming apparatus A via the network 1 to the server D when the control unit 3 obtains the consumable-goods stock information of the printing paper 21 or the toner cassette 25 from the second detector 11.

Further, the control unit 3 causes the operation indicating unit 15 to indicate another image forming apparatus such as the apparatus B that has an available stock of the printing paper 21 or the toner cassette 25 according to the consumable-goods stock information received from the server D.

Transmission of the stock retrieval information and the consumable-goods stock information from the server will be explained in explanation of the server D.

Explanation of the image forming apparatuses B and C is omitted due to the same configuration of the apparatuses B and C as the image forming apparatus A.

Next will be explained the server D.

The server D, as shown in FIG. 1, has a main control unit 35 as the center, a transmitting/receiving unit 37, a setting unit 39, a storage unit 41, a management control unit 43, an operation unit 45, a display unit 47, and other components included in a server generally.

The transmitting/receiving unit 37 is an interface unit that receives consumable-goods shortage information and consumable-goods stock information from the image forming apparatuses A, B and C via the network 1 and outputs the consumable-goods shortage information and the consumable-goods stock information to the management control unit 43 under control by the main control unit 35, and transmits stock retrieval information and consumable-goods stock information to the image forming apparatuses A, B and C via the network 1.

The transmitting/receiving unit 37 establishes connections with the image forming apparatuses A, B and C automatically when the transmitting/receiving unit 37 is connected to the network 1, and has a function for transmitting/receiving information to/from a counterpart, for example, specified with a network address or the like, as well as the transmitting/receiving unit 17.

Figures 5A, 5B, 6:
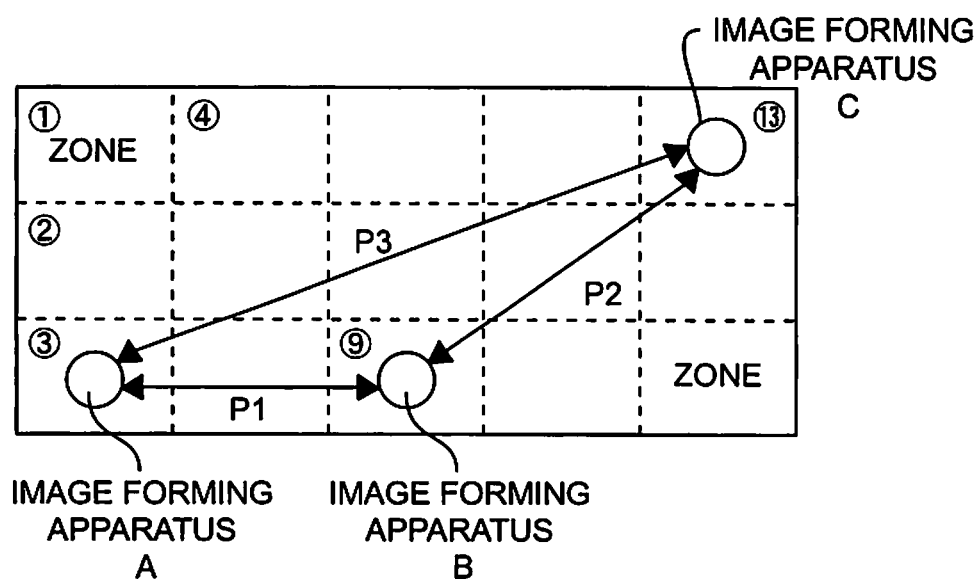
FIGS. 5A and 5B show a profile and consumable-goods state data in Embodiment 1.
FIG. 6 is a diagram that explains how to detect relationship between locations of image forming apparatuses in Embodiment 1.

The setting unit 39 is a readable-writable memory that has stored a profile as a table under control by the main control unit 35. The profile includes version information of the respective apparatuses and location information indicating the places where the respective image forming apparatuses A, B and C are placed. FIG. 5A shows an example of the profile. In this profile, the image forming apparatus A is placed at Zone 3 on the 1st floor, the image forming apparatus B is placed at Zone 9 on the 1st floor, and the image forming apparatus C is placed at Zone 13 on the 1st floor.

A location of the apparatus A, B or C is specified with any of zones in a floor map. Therefore, the location information indicates which zones the apparatuses are placed on respectively. For example, in FIG. 6, a floor map is divided into Zone 1 to Zone 15.

The storage unit 41 is a readable-writable medium such as memory or hard disk drive that stores consumable-goods state data mentioned below, control programs of the main control unit 35 and the management control unit 43, and temporary intermediate data used by the main control unit 35 and/or the management control unit 43. The same medium can be used as both the storage unit 41 and the setting unit 39.

The management control unit 43 generates stock retrieval information for retrieving for an available stock in the other image forming apparatuses (e.g. the apparatuses B and C) based on consumable-goods shortage information received from an image forming apparatus (e.g. the apparatus A). The stock retrieval information indicates the out-of-stock consumable goods specified in the consumable-goods shortage information. The management control unit 43 outputs the stock retrieval information to the transmitting/receiving unit 37 and causes the transmitting/receiving unit 37 to transmit the stock retrieval information to the other image forming apparatuses than the image forming apparatus that transmitted the consumable-goods shortage information.

The management control unit 43 may output the stock retrieval information automatically when the consumable-goods shortage information is received. In addition, the management control unit 43 may transmits an instruction to the image forming apparatuses A, B and C to request to transmit consumable-goods shortage information to the server D and then receive the consumable-goods shortage information.

The management control unit 43 determines an image forming apparatus with an available stock based on the received consumable-goods stock information. If consumable-goods stock information is received from a plurality of image forming apparatuses (e.g. the apparatuses B and C), the management control unit 43 determines the image forming apparatus (e.g. the apparatus B) nearest to the image forming apparatus (e.g. the apparatus A) that transmitted consumable-goods shortage information. The management control unit 43 generates consumable-goods stock information that specifies the image forming apparatus with an available stock, and causes the transmitting/receiving unit 37 to transmit the generated consumable-goods stock information to the image forming apparatus that transmitted consumable-goods shortage information.

The management control unit 43 may cause the transmitting/receiving unit 37 to transmit the consumable-goods stock information that specifies all of image forming apparatuses that transmitted consumable-goods stock information to the server D.

The nearest image forming apparatus may be determined according to distances between two image forming apparatuses, for example the distances P1, P2 and P3 between two of the image forming apparatuses A, B and C in FIG. 6. The distances may be calculated based on positions of the image forming apparatuses A, B and C or positions of the zones where the apparatuses A, B and C are placed.

Further, the management control unit 43 generates consumable-goods state data of the image forming apparatuses A, B and C as a table, for example, as shown in FIG. 5B, based on the received consumable-goods shortage information and the received consumable-goods stock information, and causes the storage unit 41 to store the consumable-goods state data.

The operation unit 45 is an input device such as keyboard placed on a body case (not shown) of the server D, has a function for detecting user's operation to change values of setting items in the aforementioned profile, to request operation of the server D, and so on under control by the main control unit 35.

The display unit 47 outputs the consumable-goods state data of the apparatuses A, B and C such as consumable-goods shortage information and/or consumable-goods stock information in terms of either displaying it or printing it under control by the main control unit 35 and the operation unit 45.

The main control unit 35 has a CPU and a ROM that stores a control program to be executed by the CPU, and controls the transmitting/receiving unit 37, the setting unit 39, the storage unit 41, the management control unit 43, the operation unit 45, the display unit 47, and supports functions of the management control unit 43 and so on.

Next will be explained operation of the image forming system of Embodiment 1.

It is assumed that the aforementioned profile has already been stored in the setting unit 39 of the server D.

In the image forming apparatus A, if toner empty of the toner cassette 25 takes place, then the first detector 11 outputs consumable-goods shortage information of the toner cassette 25, and the control unit 3 causes the transmitting/receiving unit 17 to transmit the consumable-goods shortage information to the server D via the network 1. In the server D, the transmitting/receiving unit 37 receives the consumable-goods shortage information, the management control unit 43 generates stock retrieval information based on the consumable-goods shortage information, and the management control unit 43 causes the transmitting/receiving unit 37 to transmit the stock retrieval information to the image forming apparatuses B and C other than the image forming apparatus A via the network 1.

In the image forming apparatuses B and C, after the transmitting/receiving unit 17 receives the stock retrieval information, the control unit 3 controls the second detector 13 to try to obtain consumable-goods stock information. If the second detector 13 outputs consumable-goods stock information, the control unit 3 causes the transmitting/receiving unit 17 to transmit the consumable-goods stock information to the server D via the network 1.

In the server D, the transmitting/receiving unit 37 receives the consumable-goods stock information, the management control unit 43 causes the transmitting/receiving unit 37 to transmit the consumable-goods stock information via the network 1 to the image forming apparatus A that transmitted the consumable-goods shortage information.

If two pieces of consumable-goods stock information are received from the respective image forming apparatuses B and C, then the management control unit 43 determines the image forming apparatus B as the image forming apparatus with an available stock nearest to the image forming apparatus A, and causes to transmit the consumable-goods stock information of the image forming apparatus B to the image forming apparatus A In the image forming apparatus A, the transmitting/receiving unit 17 receives the consumable-goods stock information, and the control unit 3 causes the operation indicating unit 15 to display the consumable-goods stock information. Consequently, for example, the image forming apparatus B is indicated such as "TONER CASSETTE IS IN IMAGE FORMING APPARATUS B." shown in FIG. 4.

It should be noted that in case of paper empty, the system operates as well as in case of toner empty.

As mentioned above, in the image forming system of Embodiment 1, the server D and the image forming apparatuses A, B and C are connected to the network 1. The server D contains (a) the transmitting/receiving unit 37 for receiving consumable-goods shortage information and consumable-goods stock information from the apparatuses A, B and C, and (b) the management control unit 43 for causing the transmitting/receiving unit 37 to transmit stock retrieval information to the image forming apparatuses other than the image forming apparatus that transmitted the consumable-goods shortage information, and to transmit the consumable-goods stock information to the image forming apparatus that transmitted the consumable-goods shortage information in order to notify the image forming apparatus with an available stock.

On the other hand, each of the image forming apparatuses A, B and C contains (a) the first detector 11 for detecting a shortage of consumable goods in this apparatus and outputting consumable-goods shortage information, (b) the second detector 13 for detecting the amount of stock of consumable goods in this apparatus and outputting consumable-goods stock information, (c) the transmitting/receiving unit 17 for transmitting the consumable-goods shortage information and the consumable-goods stock information from the first and second detectors 11 and 13 to the server D and receiving stock retrieval information and consumable-goods stock information from the server D, (d) the operation indicating unit 15 for indicating the received consumable-goods stock information and the image forming apparatus that transmitted the consumable-goods stock information, and (e) the control unit 3 for causing the transmitting/receiving unit 17 to transmit consumable-goods shortage information when the first detector 11 outputs the consumable-goods shortage information, and to transmit consumable-goods stock information when the second detector 13 detects an available stock upon reception of stock retrieval information, and for causing to indicate the image forming apparatus with an available stock determined by the consumable-goods stock information received from the server D.

Therefore, it is possible to retrieve for another image forming apparatus with an available stock of consumable goods when the consumable goods become short in an image forming apparatus and a user can supply consumable goods in a short time to the image forming apparatus with a shortage.

Recently, configuration where a plurality of image forming apparatuses is connected to a network is popular. In this embodiment, image forming apparatuses in such configuration are utilized as storages (i.e. storehouses) of consumable goods, and a user can supply consumable goods to an image forming apparatus with a shortage from the image forming apparatus with an available stock nearest to the image forming apparatus with a shortage. Consequently, it is easy to accomplish business tasks quickly and smoothly.

Further, the second detectors 13 of the image forming apparatuses A, B and C detect an available stock of consumable goods via the RFID device 33 that equips the consumable goods without contact. Consequently, it is possible to detect not only consumable goods installed in the image forming apparatuses but consumable goods put in an area where high-frequency signals can be transferred mutually between the image forming apparatus A, B or C and the RFID device 33 around the image forming apparatus A, B or C.

Further, the management control unit 43 of the server D outputs consumable-goods stock information including location information of an image forming apparatus with an available stock, and selects the image forming apparatus nearest to an image forming apparatus with a shortage from image forming apparatuses with available stocks. Consequently, a user of the image forming apparatus with a shortage can obtain consumable goods in a short time by referring to the received consumable-goods stock information, and business tasks tends to be accomplished quickly.

Furthermore, the management control unit 43 of the server D outputs the consumable-goods state data as shown in FIG. 5B, for example, in terms of printing it. Consequently, it is easy to unify stock management for the respective image forming apparatuses A, B and C.

In Embodiment 1, operation of the system in case of toner empty or paper empty is explained, but the first detector 11 in each of the image forming apparatuses A, B and C may output consumable-goods shortage information when the detector 11 detects that the remaining amount of consumable goods such as toner or paper is less than a predetermined value. In this case, it is possible to retrieve for an available stock of the consumable goods before the consumable goods become empty.

Further, the second detector 13 in the image forming apparatus A, B or C may output the consumable-goods stock information including stock status information indicating whether or not consumable goods has been installed and/or whether or not consumable goods are being used. In this case, it is possible to indicate information on how the consumable goods are stored in the image forming apparatus A, B or C.

In the image forming system of Embodiment 1, the first detector 11 that outputs consumable-goods shortage information and the second detector 13 that outputs consumable-goods stock information are placed individually. To simplify configuration, one detector may detect both consumable-goods shortage information and consumable-goods stock information. However, in case that the first detector 11 and the second detector 13 are placed individually, not only consumable goods installed in the image forming apparatus but consumable goods put near the image forming apparatus tend to be detected surely.

It should be noted that in the image forming system of Embodiment 1, consumable-goods stock information is displayed in the image forming apparatuses A, B and C, but this invention is not limited to this.

For instance, in the server D, when the consumable-goods stock information is received from the image forming apparatus A, B or C, the management control unit 43 may cause the transmitting/receiving unit 37 to transmit the consumable-goods stock information to an external computer connected to the network 1 such as a computer E. In this case, the external computer receives the consumable-goods stock information and displays the consumable-goods stock information on a display unit (not shown). Therefore, the same advantages are obtained.

In this case, a display unit (in the operation indication unit 15) is not necessary in the image forming apparatuses A, B and C.

Further, in this case, the external computer establishes a connection with the server D automatically when the external computer is connected to the network 1, and has a function for transmitting/receiving information to/from the server D, for example, specified with a network address or the like, as well as the server D.

Furthermore, the external computer may transmit an instruction to the server D in order to request transmitting consumable-goods shortage information to the external computer.

The server D is not required to be an independent apparatus in the network 1, for example, may be a component placed inside of the image forming apparatus A, B or C, a printer not shown, or another device.

Embodiment 2

Figure 7:
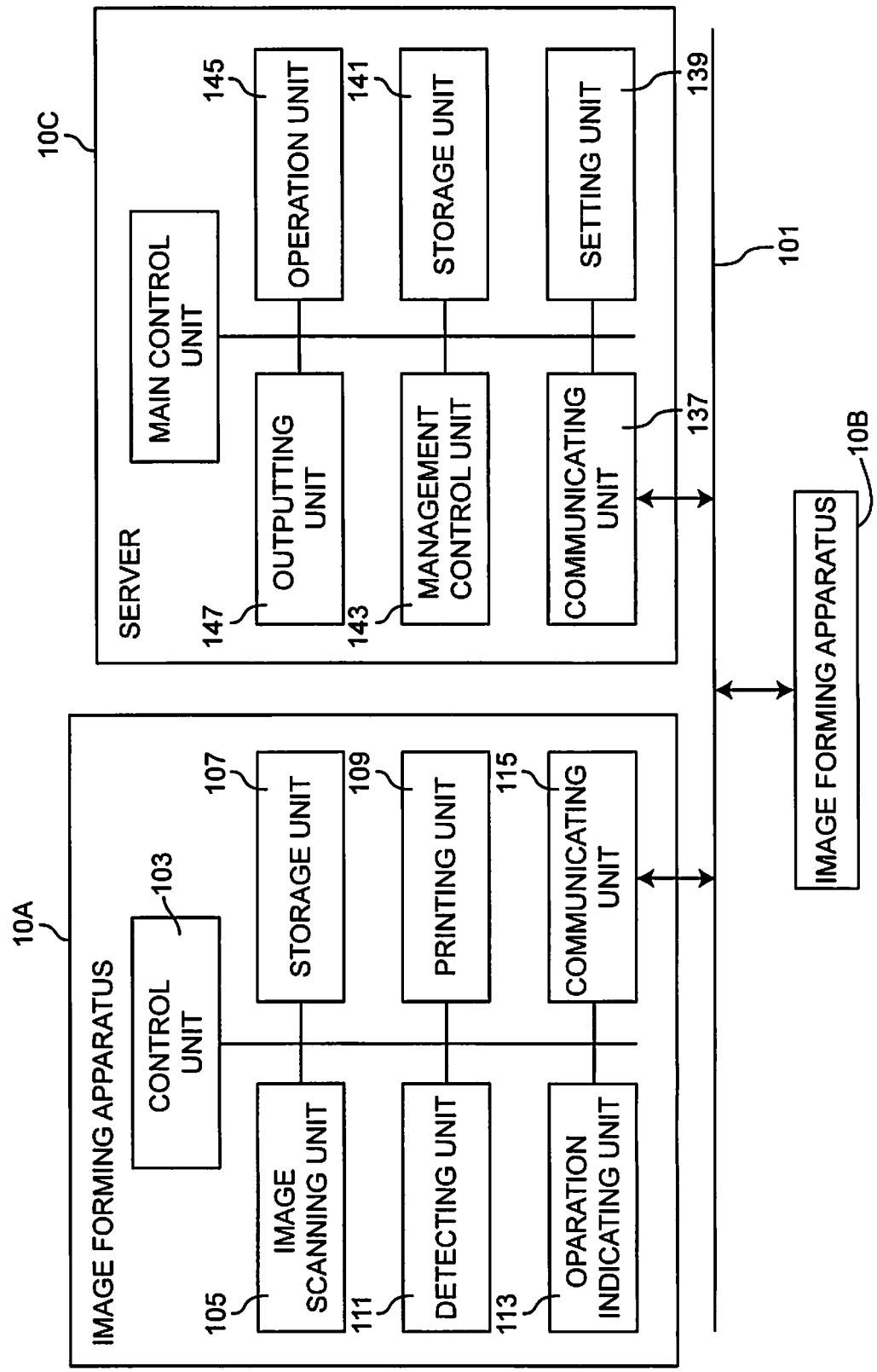
FIG. 7 is a schematic block diagram indicating an image forming system of Embodiment 2.

FIG. 7 is a schematic block diagram indicating an image forming system of Embodiment 2.

In the image forming system shown in FIG. 7, image forming apparatuses 10A and 10B, and a server 10C are connected to each other via a network 101. The network 101 is a LAN such as intranet, the Internet, or other known network.

Since the image forming apparatuses 10A and 10B has the same configuration, here is explained only the image forming apparatus 10A and detailed explanation of the image forming apparatus 10B is omitted.

Firstly, the image forming apparatus 10A is explained.

The image forming apparatus 10A is an image forming apparatus such as MFP having a control unit 103 as the center, an image scanning unit 105, a storage unit 107, a printing unit 109, a detecting unit 111, an operation indicating unit 113, and a communicating unit 115. There are other components in the image forming apparatus 10A, but here are omitted explanation and illustration of the other components.

The image scanning unit 105 is a scanner or other known device that scans optically, for example, images on pages of a printed document under control by the control unit 103 and generates electronic image data as a print job in terms of necessary processes such as filtering the images. Image data of respective pages generated by the image scanning unit 105 are stored in the storage unit 107.

The storage unit 107 stores image data scanned by the image scanning unit 105, image data received by the communicating unit 115 (mentioned below), detected consumable-goods information (mentioned below), and a control program of the control unit 103. Readable and writable medium such as hard disk drive is used as the storage unit 107.

Figure 8:
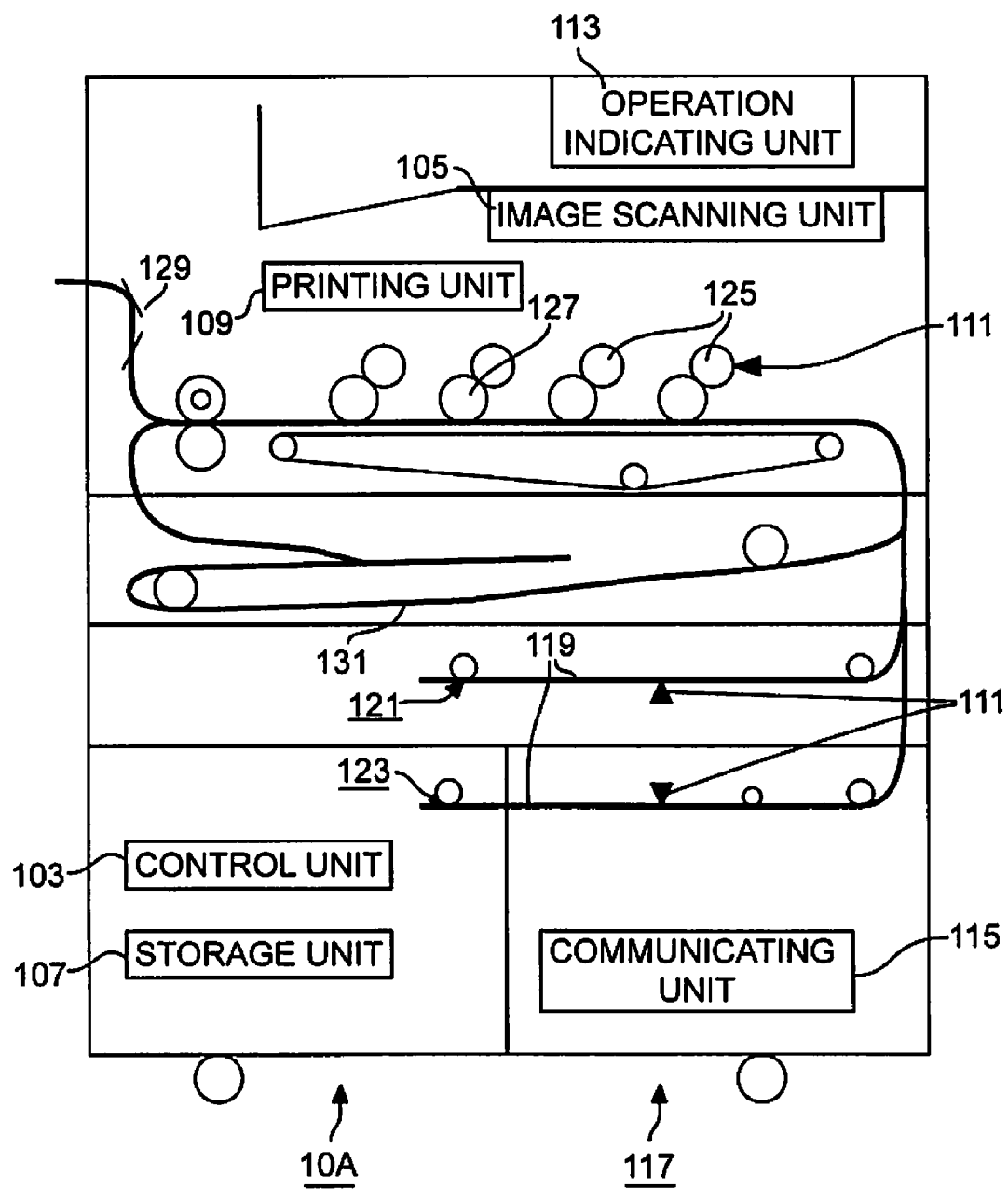
FIG. 8 shows an example of configuration of the image forming apparatus in Embodiment 2.

The printing unit 109 is either a color print engine or a monochrome print engine, and, as shown in FIG. 8, has (a) paper drawers 121 and 123 in a lower part of a body case 117 in which respective types of printing paper 119 are placed, (b) a toner cassette 125 that contains printing toner, (c) a transferring and fixing unit 127 that generates print data from the aforementioned image data, develops a toner image with printing toner from the toner cassette 125, and transfers and fixes the toner image on the printing paper 119, and (d) an outputting unit 129 that outputs the printing paper 119 on which an image has been printed, and other components.

In the printing unit 109, a reversal transportation unit 131 reverses the printing paper 119 in duplex printing.

The detecting unit 111 outputs detection information on the consumption amount to the control unit 103 under control by the control unit 103.

Specifically, the detecting unit 111 detects the remaining amount of the printing paper 119 in each of the paper drawers 121 and 123, for example, in terms of detecting the weight of the paper 119 and outputs consumable-goods information indicating the remaining amount to the control unit 103. Further, the detecting unit 111 detects the remaining amount of printing toner in the toner cassette 125 and an identification code of the toner cassette 125, and outputs consumable-goods information indicating the remaining amount and the identification code to the control unit 103. These detection and output are executed repeatedly in a predetermined short cycle (e.g. every a few minutes). Since the decreasing amount of the remaining amount is equivalent to the consumption amount, the consumable-goods information contains the remaining amount in relation to the consumption amount in this embodiment.

Figure 9:
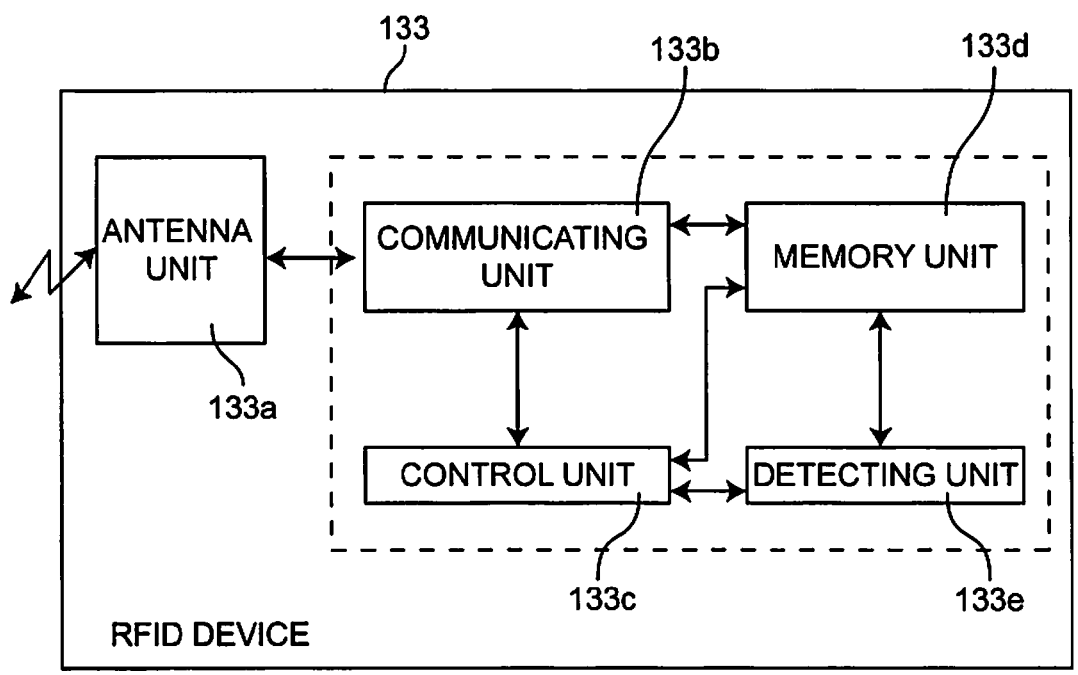
FIG. 9 is a schematic block diagram that explains configuration of a RFID device in Embodiment 2.

More specifically, the remaining amount of printing toner in the toner cassette 125 and the identification code are detected via the RFID device 133 without contact by the detecting unit 111. As shown in FIG. 9, for example, the RFID device 133 contains an antenna unit 133a, a communicating unit 133b, a control unit 133c, a memory unit 133d, and a detecting unit 133e.

The RFID device 133 equips the toner cassette 125 and operates with a power supply generated from a high-frequency signal emitted by the detecting unit 111. The high-frequency signal is received by the antenna unit 133a and demodulated and rectified by the communicating unit 133b in order to generate the power supply. In the RFID device 133, the memory unit 133d has stored the identification code assigned to the toner cassette 125, the control unit 133c reads out the identification code from the memory unit 133d, the detecting unit 133e outputs the remaining amount of printing toner, and the control unit 133c generates an output signal containing consumable-goods information in terms of combination of the identification code and information on the remaining amount of printing toner. In the communicating unit 133b, a high-frequency carrier is modulated with the output signal with a predetermined format and the modulated carrier as a high-frequency signal is emitted from the antenna unit 133a.

The detecting unit 111 has a function for receiving and demodulating the high-frequency signal from the RFID device 133 to obtain the consumable-goods information containing the identification code and the remaining amount of toner, and for outputting the consumable-goods information to the control unit 103.

The detecting unit 111 can detect the printing paper 119 that has not been put in any of the paper drawers 121 and 123 and the toner cassette 125 that has not been installed in the apparatus via the RFID device 133 without contact if the RFID device 133 equips such printing paper 119 and such toner cassette 125.

Therefore, it is possible to detect a stock of the printing paper 119 and the toner cassette 125 that are stored in or near each of the image forming apparatuses 10A and 10B, namely, in an area where the detecting unit 111 can communicate with the RFID device 133.

The operation indicating unit 113 is placed on the upper surface of the body case 117 shown in FIG. 8 and has a known liquid crystal display panel and an operation unit (a setting unit). The display panel is a display unit capable of indicating various operation states of the apparatus. The operation unit can detect user's touch operation to a position where an image related to an operation of the apparatus is displayed on the panel.

Referring to FIG. 7 again, the communicating unit 115 is an interface unit that transmits/receives image data via the network 1 to/from the other image forming apparatus 10B according to a predetermined communication protocol, transmits the consumable-goods information to the server 10C, and receives indication information and other control information mentioned below from the server 10C.

Further, the communicating unit 115 establishes connections with the other image forming apparatus 10B and the server 10C automatically, and has a function for transmitting/receiving information to/from a counterpart, for example, specified with a network address or the like. In addition, the communicating unit 115 also transmits and receives facsimile signals.

The control unit 103 has a CPU and a ROM that stores a control program to be executed by the CPU, and controls the image scanning unit 105, the storage unit 107, the printing unit 109, the detecting unit 111, the operation indicating unit 113, the communicating unit 115 and other components not shown.

Further, the control unit 103 causes the communicating unit 115 to transmit consumable-goods information that specifies this image forming apparatus 10A via the network 101 to the server 10C when the control unit 103 obtains the consumable-goods information of the printing paper 119 or the toner cassette 125 from the detecting unit 111.

Further, the control unit 103 controls the image scanning unit 105, the storage unit 107, the printing unit 109 or the detecting unit 111 according to control information received by the communicating unit 115 from the server 10C, and causes the operation indicating unit 113 to display indication information received by the communicating unit 115 from the server 10C.

Explanation of the image forming apparatus 10B is omitted due to the same configuration of the apparatus 10B as the image forming apparatus 10A.

Next will be explained the server 10C.

The server 10C, as shown in FIG. 7, has a main control unit 135 as the center, a communicating unit 137, a setting unit 139, a storage unit 141, a management control unit 143, an operation unit 145, a display unit 147, and other components included in a server generally.

The communicating unit 137 is an interface unit that receives consumable-goods information from the image forming apparatuses 10A and 10B via the network 101 and outputs the consumable-goods information to the management control unit 143 under control by the main control unit 135, and transmits indication information and control information to the image forming apparatuses 10A and 10B via the network 101.

The communicating unit 137 establishes connections with the image forming apparatuses 10A and 10B automatically when the communicating unit 137 is connected to the network 101, and has a function for transmitting/receiving information to/from a counterpart, for example, specified with a network address or the like, as well as the communicating unit 115.

The setting unit 139 is a readable-writable memory that has stored consumable-goods management data as a profile under control by the main control unit 135. The consumable-goods management data includes a replacement threshold value (e.g. by percent) of the toner cassette 125 and a replenishment threshold value (e.g. by percent) of the printing paper 119 for each of the image forming apparatuses 10A and 10B, for example, shown in FIG. 10A.

In addition to the replacement threshold value and the replenishment threshold value, the setting unit 139 also has stored either an increment value or a decrement value in the consumable-goods management data to change the replacement threshold value and the replenishment threshold value in each of predetermined time periods such as TIME PERIOD 1 from 9:00 to 20:00 and TIME PERIOD 2 from 20:00 to 9:00.

The replacement threshold value of the toner cassette 125 and the replenishment threshold value of the printing paper 119 are the values to determine that replacement of the toner cassette 125 and replenishment of the printing paper 119 are required, respectively. If the remaining amounts of toner and paper in the consumable-goods information from each of the image forming apparatuses 10A and 10B become less than the values (i.e. the consumption amounts exceed thresholds), then it is determined that replacement of the toner cassette 125 and replenishment of the printing paper 119 are required, respectively.

The storage unit 141 is a readable-writable medium such as memory or hard disk drive that stores the consumable-goods management data, control programs of the main control unit 135 and the management control unit 143, and temporary intermediate data used by the main control unit 135 and/or the management control unit 143. The same medium can be used as both the storage unit 141 and the setting unit 139.

The management control unit 143 compares a value of the received consumable-goods information with either a replacement threshold value of the toner cassette 125 or a replenishment threshold value of the printing paper 119 with reference to the consumable-goods management data in the setting unit 139, and generates either replacement information or replenishment information indicating that replacement or replenishment of consumable goods is required as shown in FIG. 10B when the management control unit 143 determines that a value of the consumable-goods information is less than either the replacement threshold value or the replenishment threshold value.

When the management control unit 143 compares a value of the received consumable-goods information with either the replacement threshold value or the replenishment threshold value within the predetermined time periods (e.g. TIME PERIOD 1 from 9:00 to 20:00 and TIME PERIOD 2 from 20:00 to 9:00) set in the consumable-goods management data, the management control unit 143 changes the threshold value with regard to either the increment value or the decrement value in the consumable-goods management data.

In the case shown in FIG. 10A, according to empirical knowledge, the consumption amount is large in TIME PERIOD 1 from 9:00 to 20:00 and therefore in TIME PERIOD 1, if the remaining amount of toner becomes less than 15 percent, then replacement information is output, and the consumption amount is small in TIME PERIOD 2 from 20:00 to 9:00 and therefore in TIME PERIOD 2, unless the remaining amount of toner becomes less than 7 percent, replacement information is not output.

The management control unit 143 generates a purchase order (i.e. an order list) of the toner cassette 125 and/or the printing paper 119 described in replacement information and/or replenishment information when outputting the replacement information and/or the replenishment information (see FIG. 11), causes the outputting unit 147 to output the purchase order or causes the communicating unit 137 to transmit the purchase order to a preset address via the network 101, and causes the communicating unit 139 to transmit indication information indicating that the purchase order has been output. The indication information is transmitted to the image forming apparatus 10A or 10B that needs the replacement and/or the replenishment.

The operation unit 145 is an input device such as keyboard placed on a body case (not shown) of the server 10C, has a function for detecting user's operation to change values of setting items in the consumable-good management data, to request operation of the server 10C, and so on under control by the main control unit 135.

The display unit 147 outputs the consumable-goods management data and the purchase order in terms of either displaying it or printing it under control by the main control unit 135 and the operation unit 145. The display unit 147 has a displaying function and a printing function as well as the printing unit 109 and the operation indicating unit 113 in the image forming apparatus 10A

The main control unit 135 has a CPU and a ROM that stores a control program to be executed by the CPU, and controls the communicating unit 137, the setting unit 139, the storage unit 141, the management control unit 143, the operation unit 145, the display unit 147, and supports functions of the management control unit 143 and so on.

Next will be explained operation of the image forming system of Embodiment 2.

It is assumed that the aforementioned consumable-goods management data has already been stored in the setting unit 139 of the server 10C.

In the image forming apparatus 10A, the detecting unit 111 detects the remaining amount of toner in the toner cassette 125 and outputs the remaining amount of toner as consumable-goods information of the toner cassette 125, and the control unit 103 causes the communicating unit 115 to transmit the consumable-goods information to the server 10C via the network 101.

In the server 10C, the communicating unit 137 receives the consumable-goods information and outputs it to the management control unit 143. The management control unit 143 compares a value of the received consumable-goods information with a replacement threshold value of the toner cassette 125 with reference to the consumable-goods management data in the setting unit 139. When the management control unit 143 determines that a value of the consumable-goods information is less than the replacement threshold value, the management control unit 143 generates replacement information indicating "NEED REPLACEMENT" shown in FIG. 10B, stores it as a part of the consumable-goods management data in the storage unit 141, and causes the outputting unit 147 to display it.

Further, the management control unit 143 generates a purchase order of the toner cassette 125 as shown in FIG. 11 and causes the communicating unit 137 to transmit the purchase order to a preset address via the network 101 to order the toner cassette 125.

Moreover, the management control unit 143 causes to transmit indication information indicating that the purchase order has been transmitted. The indication information is transmitted to the image forming apparatus 10A that needs the toner cassette 125, and the image forming apparatus 10A receives it and displays notification as shown in FIG. 11 on the operation indicating unit 113.

It should be noted that in case of the printing paper 119, the system operates as well as in case of the toner cassette 125.

As mentioned above, in the image forming system of Embodiment 2, the server 10C and the image forming apparatuses 10A and 10B are connected to the network 101. Each of the image forming apparatuses 10A and 10B contains (a) the detecting unit 111 for outputting consumable-goods information in relation to the consumption amount of consumable goods in this image forming apparatus, (b) the communicating unit 115 for transmitting the consumable-goods information to the server 10C via the network 101, and (c) the control unit 103 for causing the communicating unit 115 to transmit the consumable-goods information if the detecting unit 111 outputs the consumable-goods information. The server 10C contains (a) the communicating unit 137 for receiving the consumable-goods information from the image forming apparatus 10A or 10B via the network 101, (b) the outputting unit 147 for outputting consumable-goods management data in terms of either printing or displaying it, and (c) the management control unit 143 for generating the consumable-goods management data based on the consumable-good information received by the communicating unit 137, and causing the outputting unit 147 to output the consumable-goods management data.

Therefore, it is possible to unify and confirm the consumption amounts of consumable goods in the respective image forming apparatuses 10A and 10B, and it is possible for a user to replenish and/or replace consumable goods before the consumable goods become short, especially for high-consumed consumable goods such as printing toner or printing paper.

Further, since a purchase order is transmitted when the remaining amount of either printing toner or printing paper becomes less than a predetermined threshold, it is possible to arrange replenishment and/or replacement quickly.

If an administrator of the server 10C always confirms the consumable-goods management data and the purchase order on a server side, then the administrator is not required user management in locations where the image forming apparatuses 10A and 10B are placed, and easily decides when the administrator should visit users to maintain the apparatuses 10A and 10B.

Furthermore, since the detecting unit 111 of each of the image forming apparatuses 10A and 10B detects the consumption amount of consumable goods with the RFID device 133 placed on either the toner cassette 125 or the printing paper 119, it is possible to detect not only consumable goods installed in the image forming apparatus 10A or 10B but detectable consumable goods put near the image forming apparatus 10A or 10B.

In addition, since the management control unit 143 of the server 10C changes the threshold values with preset increment/decrement values in respective time periods, it is possible to manage replenishment and/or replacement in consideration of usage conditions of the respective image forming apparatuses 10A and 10B in predetermined working time or seasons such as the end and the beginning of a year or the end of a fiscal year.

The time periods may be set as not only predetermined hours but also predetermined days such as 1st to 10th, 11th to 20th and 21st to 31st. If the time periods are set as 1st to 10th, 11th to 20th and 21st to 31st and the threshold value of the end of a month (i.e. 21st to 31st) is set large, then it is possible to avoid toner empty effectively, even though toner is consumed a lot at the end of a month.

In the aforementioned image forming system, the toner cassette 125 and the printing paper 119 are explained as instances of consumable goods. In addition to them, the image forming system of Embodiment 2 may manage the consumption amount of other consumable goods such as a transfer drum (not shown), a photoconductor drum (not shown) or a used-toner box (not shown) in the transferring and fixing unit 127. A counted value such as the number of usage or usage period of consumable goods may be used as consumable-goods information in relation to the consumption amount, other than the remaining amount of toner or paper. In Embodiment 2, the remaining amount, the number of usage, the user period or the like may be used as consumable-goods information in relation to the consumption amount of consumable goods.

The server 10C is not required to be an independent apparatus in the network 101, for example, may be a component placed inside of the image forming apparatus 10A or 10B, a printer not shown, or another device.

What is claimed is:

1. An image forming system comprising:
   two or more image forming apparatuses connected to a network; and
   a server that is connected to the network and manages the image forming apparatuses, wherein the server comprises:
   a server transmitting/receiving unit that receives consumable-goods shortage information and consumable-goods stock information via the network and transmits, via the network, the consumable-goods stock information and stock retrieval information for retrieving consumable goods, the consumable-goods shortage information indicating a shortage of consumable goods in an image forming apparatus, the consumable-goods stock information indicating an available stock in an image forming apparatus;
   memory that stores location information regarding each image forming apparatus' location; said location information being specified by zones on a floor map; and
   a management control unit that causes the server transmitting/receiving unit to transmit the stock retrieval information to the other image forming apparatuses than one of the image forming apparatuses that transmits the consumable-goods shortage information to the server, and causes the server transmitting/receiving unit to transmit the consumable-goods stock information obtained from the other image forming apparatuses to the image forming apparatus that transmitted the consumable-goods shortage information; said consumable-goods stock information including location information of one of the other image forming apparatuses that is closest to the image forming apparatus that transmitted the consumable goods shortage information; said management control unit calculating the distances between the image forming apparatuses based on said location information in order to determine the closest image forming apparatus that transmits consumable goods stock information;
   wherein each of the image forming apparatuses comprises:
   a detecting unit that detects a shortage and a stock of consumable goods and outputs the consumable-goods shortage information and the consumable-goods stock information of this image forming apparatus;
   an apparatus transmitting/receiving unit that transmits the consumable-goods shortage information and/or the consumable-goods stock information from the detecting unit to the server, and receives the stock retrieval information and/or the consumable-goods stock information from the server;

a display unit and a control unit that causes the apparatus transmitting/receiving unit to transmit the consumable-goods shortage information if the detecting unit outputs the consumable-goods shortage information, and to transmit the consumable-goods stock information if the detecting unit detects a stock of consumable goods specified in the stock retrieval information received by the apparatus transmitting/receiving unit wherein the management control unit of the server causes the server transmitting/receiving unit to transmit the consumable-goods stock information to the image forming apparatus that transmitted the consumable-goods shortage information, and the control unit of the image forming apparatus causes the display unit to indicate the received consumable-goods stock information and the image forming apparatus transmitting the received consumable-goods stock information.

2. The image forming system according to claim 1, wherein the consumable goods are either printing toner or printing paper.

3. The image forming system according to claim 1, wherein the detecting unit of an image forming apparatus detects a stock of consumable goods with a RFID device placed on the consumable goods.

4. The image forming system according to claim 1, wherein the detecting unit outputs the consumable-goods stock information including stock status information indicating whether or not consumable goods has been installed and/or whether or not consumable goods are being used.

5. The image forming system according to claim 1, wherein the detecting unit comprises:
  a first detector that outputs the consumable-goods shortage information, and
  a second detector that outputs the consumable-goods stock information.

6. The image forming system according to claim 1, wherein the control unit of the image forming apparatus causes the apparatus transmitting/receiving unit to transmit the consumable-goods stock information to a computer connected to the network.

* * * * *